(12) United States Patent
Sakashita et al.

(10) Patent No.: US 10,876,703 B2
(45) Date of Patent: Dec. 29, 2020

(54) ROD-SHAPED LIGHT GUIDE AND VEHICLE LAMP

(71) Applicant: KOITO MANUFACTURING CO., LTD., Tokyo (JP)

(72) Inventors: Asami Sakashita, Shizuoka (JP); Kazuyuki Ishikawa, Shizuoka (JP); Hiroaki Hara, Shizuoka (JP); Koki Matsui, Shizuoka (JP); Hiroyuki Sonoda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/101,051

(22) Filed: Aug. 10, 2018

(65) Prior Publication Data

US 2019/0049088 A1 Feb. 14, 2019

(30) Foreign Application Priority Data

Aug. 14, 2017 (JP) ................................. 2017-156361
Jun. 26, 2018 (JP) ................................. 2018-121136

(51) Int. Cl.
*F21S 43/237* (2018.01)
*F21V 8/00* (2006.01)
(Continued)

(52) U.S. Cl.
CPC ............. *F21S 43/237* (2018.01); *F21S 41/24* (2018.01); *F21S 43/239* (2018.01);
(Continued)

(58) Field of Classification Search
CPC ...... F21S 43/237; F21S 43/239; F21S 43/247; F21S 43/245; F21S 41/24; G02B 6/0035;
(Continued)

(56) References Cited

U.S. PATENT DOCUMENTS 5,386,347 A * 1/1995 Matsumoto .......... G02B 6/0036
362/23.15
5,881,201 A * 3/1999 Khanarian ........... G02B 6/0041
385/146

(Continued)

FOREIGN PATENT DOCUMENTS

CN 101097049 A 1/2008
CN 102759055 A 10/2012
(Continued)

OTHER PUBLICATIONS

Chinese Office Action dated Jul. 1, 2020 issued in corresponding Chinese Patent Application No. 201810901581.4, with English translation (14 pages).
(Continued)

*Primary Examiner* — Erin Kryukova
(74) *Attorney, Agent, or Firm* — Buchanan Ingersoll & Rooney PC (57) ABSTRACT

A light guide is configured to allow at least a portion of light incident on a light-incident surface to be emitted through a peripheral surface. The light guide includes a light guide portion extending in a lengthwise direction of the light guide and formed of a first material and a luminous portion extending in the lengthwise direction of the light guide along the light guide portion and formed of a second material. The second material has a haze value greater than a haze value of the first material.

11 Claims, 9 Drawing Sheets

(51) Int. Cl.
*F21S 43/249* (2018.01)
*F21S 41/24* (2018.01)
*F21S 43/247* (2018.01)
*F21S 43/239* (2018.01)
*F21S 43/245* (2018.01)

(52) U.S. Cl.
CPC ........... *F21S 43/245* (2018.01); *F21S 43/247* (2018.01); *F21S 43/249* (2018.01); *G02B 6/001* (2013.01); *G02B 6/002* (2013.01); *G02B 6/0035* (2013.01); *G02B 6/0046* (2013.01)

(58) Field of Classification Search
CPC .... G02B 6/004; G02B 6/0041; G02B 6/0043; G02B 6/001
See application file for complete search history.

(56) References Cited

U.S. PATENT DOCUMENTS

| | | | | |
|---|---|---|---|---|
| 5,899,552 | A * | 5/1999 | Yokoyama | G02B 6/0038 349/62 |
| 6,206,535 | B1 * | 3/2001 | Hattori | G02B 6/0041 362/23.16 |
| 7,389,020 | B2 * | 6/2008 | Dixon | G02B 6/001 385/100 |
| 9,116,265 | B2 * | 8/2015 | Iwasaki | G02B 6/0041 |
| 9,128,220 | B2 * | 9/2015 | Ochi | G02B 6/0033 |
| 9,182,531 | B2 * | 11/2015 | Brick | G02B 6/0041 |
| 2005/0189545 | A1 * | 9/2005 | Tazawa | B60Q 1/0011 257/79 |
| 2006/0044825 | A1 * | 3/2006 | Sa | B60Q 1/0058 362/600 |
| 2008/0044564 | A1 * | 2/2008 | Kanade | G02B 6/0041 427/203 |
| 2009/0103327 | A1 * | 4/2009 | Iwasaki | G02B 6/0041 362/617 |
| 2009/0257242 | A1 * | 10/2009 | Wendman | G02B 6/0003 362/553 |
| 2010/0238678 | A1 * | 9/2010 | Lin | G02B 6/0006 362/551 |
| 2012/0051092 | A1 * | 3/2012 | Kanade | G02B 6/001 362/629 |
| 2012/0051093 | A1 * | 3/2012 | Kanade | G02B 6/0021 362/629 |
| 2013/0242610 | A1 * | 9/2013 | Ochi | G02B 6/0033 362/611 |
| 2013/0314940 | A1 * | 11/2013 | Russert | C03B 37/01222 362/556 |
| 2014/0003075 | A1 | 1/2014 | Yamada et al. | |
| 2014/0022816 | A1 | 1/2014 | Iwasaki | |
| 2014/0177260 | A1 * | 6/2014 | George | F21K 9/61 362/555 |
| 2014/0334171 | A1 * | 11/2014 | Kropac | G02B 6/001 362/510 |
| 2016/0252228 | A1 * | 9/2016 | Martinez | G02B 6/0018 362/511 |
| 2018/0074251 | A1 * | 3/2018 | Berard | G02B 5/0242 |
| 2018/0086028 | A1 * | 3/2018 | Berard | B60Q 1/268 |
| 2018/0149325 | A1 * | 5/2018 | Lee | F21S 2/00 |
| 2019/0179070 | A1 * | 6/2019 | Vasylyev | G02B 6/0036 |

FOREIGN PATENT DOCUMENTS

| | | |
|---|---|---|
| CN | 105202439 A | 12/2015 |
| WO | 2010/128481 A2 | 11/2010 |
| WO | 2014/199563 A1 | 12/2014 |

OTHER PUBLICATIONS

Written Opinion on Patentability of the Invention issued by the National Institute of Industrial Property in corresponding French Patent Application No. 1857385 dated Aug. 17, 2020 (12 pages including partial English translation).

\* cited by examiner

ROD-SHAPED LIGHT GUIDE AND VEHICLE LAMP

BACKGROUND OF THE INVENTION

1. Field of the Invention

The present invention relates to rod-shaped light guides. The present invention further relates to vehicle lamps for use, for example, in vehicles such as automobiles.

2. Description of the Related Art

To date, there is known a vehicle lamp that includes a light source and a light guide disposed to receive light emitted from the light source at an end surface thereof. This light guide allows the light guided thereinto to be emitted toward the front of the vehicle through an exit surface extending in a direction in which the light guide extends. In the light guide, a number of reflective steps are formed in a surface opposite to the exit surface, and these reflective steps reflect the light guided into the light guide toward the exit surface (see, for example, International Patent Publication No. 2014/199563).

As described in International Patent Publication No. 2014/199563, a general conception is that rugged-shaped reflective elements, called steps, need to be formed on a surface opposite to an exit surface extending in the direction in which the light guide extends, in order to allow the light to be emitted efficiently with desired uniformity through the exit surface.

SUMMARY OF THE INVENTION

The present invention has been made in view of the above and is directed to providing a novel rod-shaped light guide that allows light to be emitted through a peripheral surface having no rugged surface shape, such as steps, and providing a vehicle lamp including such a rod-shaped light guide.

To solve the foregoing problem, a rod-shaped light guide according to an aspect of the present invention is configured to allow at least a portion of light incident on a light-incident surface to be emitted through a peripheral surface. The rod-shaped light guide includes a light guide portion extending in a lengthwise direction of the rod-shaped light guide and formed of a first material and a luminous portion extending in the lengthwise direction of the rod-shaped light guide along the light guide portion and formed of a second material. The second material has a haze value greater than a haze value of the first material.

According to this aspect, the rod-shaped light guide includes the light guide portion and the luminous portion each extending in the lengthwise direction of the rod-shaped light guide, and the luminous portion is formed of a material having a higher light-diffusing property than the material of the light guide portion. Therefore, light that travels in the light guide portion is diffused upon entering the luminous portion. The diffused light can be emitted through the peripheral surface of the light guide. Accordingly, the rod-shaped light guide allows the light to be emitted through the peripheral surface even with no rugged surface shape, such as a step, formed in the peripheral surface.

The haze value of the first material may be less than 1% when the haze value is measured with the thickness of the first material set to 4 mm.

The haze value of the second material may be no less than 7% when the haze value is measured with the thickness of the second material set to 4 mm.

The haze value of the second material may be no greater than 30% when the haze value is measured with the thickness of the second material set to 4 mm.

A proportion of an area of the luminous portion with respect to a total area of a section of the rod-shaped light guide along a plane perpendicular to the lengthwise direction thereof may differ at different positions in the rod-shaped light guide in the lengthwise direction thereof.

A proportion of an area of the luminous portion with respect to a total area of a section of the rod-shaped light guide along a plane perpendicular to the lengthwise direction thereof may be greater as a distance from the light-incident surface increases in the lengthwise direction of the rod-shaped light guide.

A section of the rod-shaped light guide along a plane perpendicular to the lengthwise direction thereof may have one of a polygonal shape, a circular shape, and a shape in which a polygon and a circle are combined.

The second material may contain a light diffusing agent, and the first material may contain no light diffusing agent or contain the light diffusing agent at a concentration lower than that in the second material.

The rod-shaped light guide may be an integrally molded piece.

No step serving as a reflective element may be formed in the peripheral surface of the rod-shaped light guide.

The peripheral surface of the rod-shaped light guide may include a step serving as a reflective element.

The rod-shaped light guide may be configured such that the luminous portion emits dimmer light at a position closer to the light-incident surface and emits brighter light at a position farther from the light-incident surface.

An aspect of the present invention provides a vehicle lamp. The vehicle lamp may include the rod-shaped light guide according to any one of the above aspects. The light guide portion may have a first light-exit surface constituting a portion of the peripheral surface, and the luminous portion may have a second light-exit surface constituting another portion of the peripheral surface. The rod-shaped light guide may be disposed such that one of the first light-exit surface and the second light-exit surface is oriented toward the front of the vehicle lamp.

DETAILED DESCRIPTION OF THE INVENTION

The invention will now be described by reference to the preferred embodiments. This does not intend to limit the scope of the present invention, but to exemplify the invention.

Hereinafter, the present invention will be described on the basis of exemplary embodiments with reference to the drawings. The embodiments are illustrative in nature and are not intended to limit the invention. Not all the features described in the embodiments and combinations thereof are necessarily essential to the invention. Identical or equivalent constituent elements, members, and processes illustrated in the drawings are given identical reference characters, and duplicate descriptions thereof will be omitted as appropriate. The scales and the shapes of the components illustrated in the drawings are set merely for convenience to facilitate the descriptions and are not to be interpreted as limiting the invention, unless specifically indicated otherwise. Terms such as "first" and "second" used in the present specification and in the claims do not indicate the order or the importance in any way and are merely for distinguishing between a given configuration and another configuration.

Figure 1:
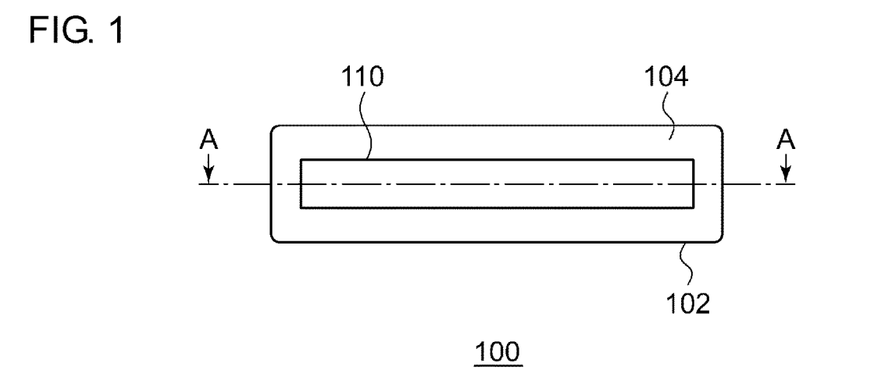
FIG. 1 is a schematic front view for describing a vehicle lamp according to an embodiment.
Figure 2:
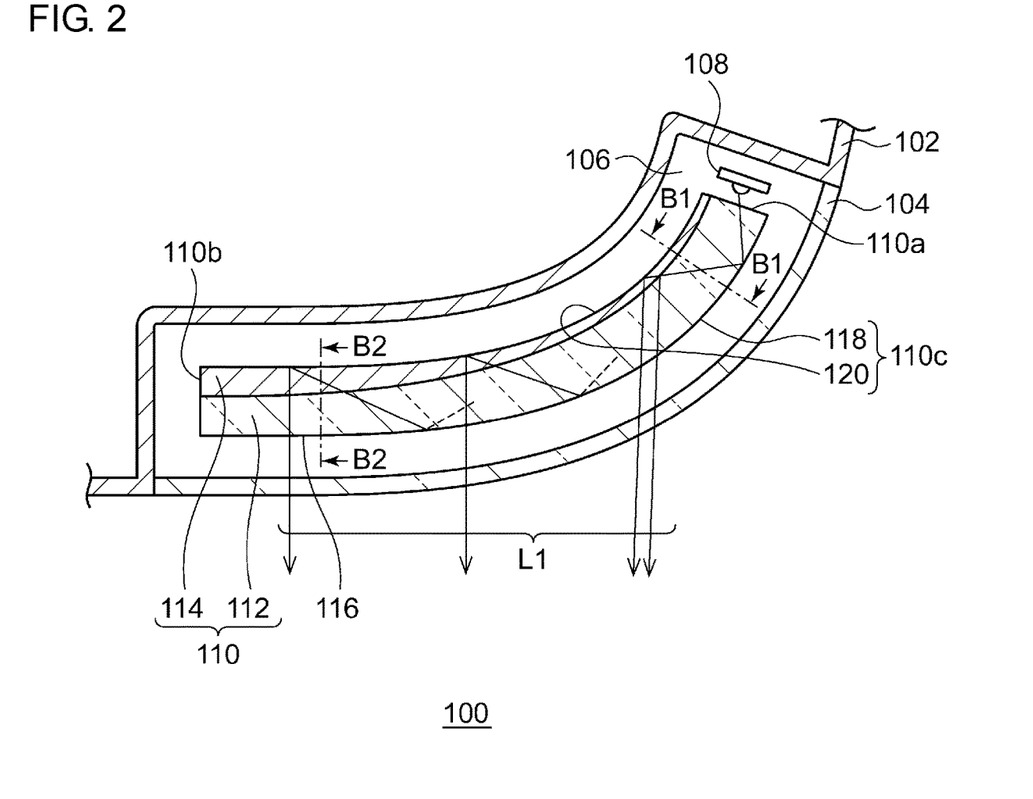
FIG. 2 is a sectional view of the vehicle lamp illustrated in FIG. 1, taken along the A-A line.
Figure 3A:
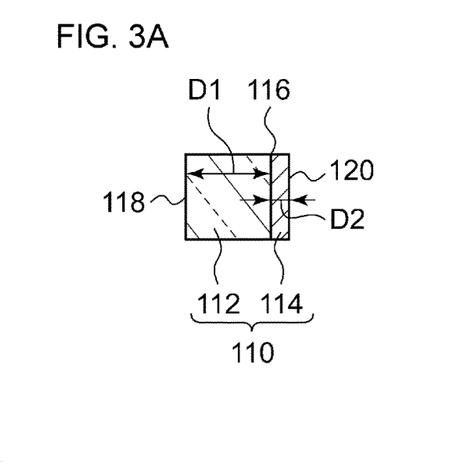
FIG. 3A is a sectional view of a rod-shaped light guide in the vehicle lamp illustrated in FIGS. 1 and 2, taken along the B1-B1 line.
Figure 3B:
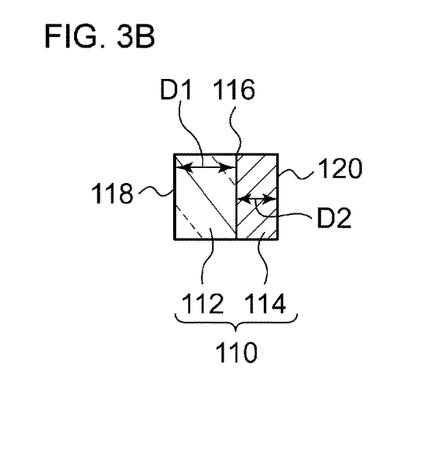
FIG. 3B is a sectional view of the rod-shaped light guide in the vehicle lamp illustrated in FIGS. 1 and 2, taken along the B2-B2 line.

FIG. 1 is a schematic front view for describing a vehicle lamp according to an embodiment. FIG. 2 is a sectional view of the vehicle lamp illustrated in FIG. 1, taken along the A-A line. FIG. 3A is a sectional view of a rod-shaped light guide in the vehicle lamp illustrated in FIGS. 1 and 2, taken along the B1-B1 line. FIG. 3B is a sectional view of the rod-shaped light guide in the vehicle lamp illustrated in FIGS. 1 and 2, taken along the B2-B2 line.

A vehicle lamp 100 is used as a clearance lamp mounted in a front portion of a vehicle, for example. The vehicle lamp 100 includes a lamp body 102 having an opening and a light-transmissive outer cover 104 that covers the opening in the lamp body 102. The lamp body 102 and the outer cover 104 form a lamp room 106, and a light source 108 and a rod-shaped light guide (hereinafter, also referred to simply as a light guide) 110 are housed in the lamp room 106. The light source 108 and the light guide 110 are each fixed to the lamp body 102.

The light source 108 is a light-emitting diode (LED), for example. Alternatively, the light source 108 may be a laser diode (LD), another semiconductor light-emitting element such as an organic or inorganic electroluminescent (EL) element, an incandescent lamp, a halogen lamp, a discharge lamp, or the like.

In the present embodiment, the light guide 110 extends in a curve along a curved shape of the lamp body 102 and the outer cover 104. The shape of the light guide 110, however, is not particularly limited, and the light guide 110 may extend linearly, for example. The direction (lengthwise direction) in which the light guide 110 extends substantially follows along the widthwise direction of the vehicle, but this is not a limiting example. In FIGS. 1 and 2, the widthwise direction of the vehicle corresponds to the right-left direction. The section of the light guide 110 along a plane perpendicular to its lengthwise direction is rectangular in the present embodiment. This, however, is not a limiting example, and the stated section may have a circular shape or any other shape.

In the present embodiment, the light guide 110 has one end surface serving as a light-incident surface 110a, another end surface 110b, and a peripheral surface 110c that connects the two end surfaces. The light source 108 is disposed to oppose the light-incident surface 110a. The light guide 110 is disposed such that the light-incident surface 110a is located outward in the widthwise direction of the vehicle and the other end surface 110b is located inward in the widthwise direction of the vehicle. The light guide 110 is configured to allow at least a portion of light incident on the light-incident surface 110a to be emitted through the peripheral surface 110c.

The light guide 110 includes a light guide portion 112 extending in the lengthwise direction of the light guide 110 and a luminous portion 114 extending in the lengthwise direction of the light guide 110 along the light guide portion 112. The light guide portion 112 and the luminous portion 114 are bonded to each other at an interface 116. The light guide portion 112 has a first light-exit surface 118 constituting a portion of the peripheral surface 110c of the light guide 110. The luminous portion 114 has a second light-exit surface 120 constituting a portion of the peripheral surface 110c of the light guide 110. As described above, the light guide 110 has a rectangular cross-section in the present embodiment. Thus, the first light-exit surface 118 is one side surface of the light guide 110, and the second light-exit surface 120 is another side surface of the light guide 110 opposite to the first light-exit surface 118. The light guide 110 is disposed such that the first light-exit surface 118 is oriented toward the front of the lamp.

The light guide portion 112 is formed of a first material, and the luminous portion 114 is formed of a second material. The first material is, for example, a first resin material that contains no light diffusing agent. The first resin material is a resin material having a light-transmissive property, or a transparent thermoplastic resin or thermosetting resin, such as polycarbonate resin or acrylic resin. The second material is a second resin material that contains a light diffusing agent. The second resin material is a resin material having an optical property (e.g., refractive index) identical to that of the first resin material and may be a material identical to the first resin material. The first material may contain a light diffusing agent at a concentration lower than that in the second material.

In the present embodiment, the light guide 110 is an integrally molded piece. The light guide 110 can be manufactured through a well-known double-color molding process or the like with the use of the first material and the second material.

Examples of the light diffusing agent include a metal oxide particle, such as a titanium dioxide particle. The mean particle size of the titanium dioxide particle is, for example, from 150 nm to 500 nm, preferably from 160 nm to 450 nm, more preferably from 170 nm to 450 nm, even more preferably from 200 nm to 400 nm, and particularly preferably from 220 nm to 400 nm. The content of the light diffusing agent is, for example, from 0.1 mass ppm to 100 mass ppm with respect to the total mass of the luminous portion 114, preferably from 0.1 mass ppm to 50 mass ppm, and more preferably from 0.1 mass ppm to 10 mass ppm. The proportion of rutile transformation in the titanium dioxide particle is, for example, no less than 50 mass %, preferably no less than 60 mass %, more preferably no less than 70 mass %, and even more preferably no less than 90 mass %. The luminous portion 114 may contain another monomer that can be copolymerized with a primary monomer of a resin used therein or a typical additive, such as an antistatic agent, an antioxidant, a release agent, a flame retardant, a lubricant, a flow improver, a filler, or a light stabilizer.

The second material has a haze value greater than the haze value of the first material. When the haze value is measured with the thickness of the first material set to 4 mm, the light guide portion 112, in at least a portion thereof, has a haze value in the thickness direction of no less than 0% and less than 7% and preferably no less than 0% and less than 1% (e.g., 0%). When the haze value is measured with the thickness of the second material set to 4 mm, the luminous portion 114, in at least a portion thereof, has a haze value in the thickness direction of no less than 7% nor more than 30%. The haze values of the light guide portion 112 and the luminous portion 114 can be measured with the use of the haze meter HZ-2 (manufactured by Suga Test Instruments Co., Ltd.) in accordance with JIS K7136.

The peripheral surface 110c of the light guide 110 has no rugged-shaped reflective element, or so-called steps. The peripheral surface 110c has a smooth shape along the lengthwise direction of the light guide 110.

FIG. 3A illustrates a section of the light guide 110 along a plane perpendicular to its lengthwise direction at a position close to the light-incident surface 110a in the lengthwise direction. FIG. 3B illustrates a section of the light guide 110 along a plane perpendicular to its lengthwise direction at a position far from the light-incident surface 110a in the lengthwise direction.

As can be seen from FIGS. 2, 3A, and 3B, in the present embodiment, the proportion of the area of the luminous portion 114 with respect to the total area of the section of the light guide 110 along a plane perpendicular to its lengthwise direction is greater as the distance from the light-incident surface 110a increases in the lengthwise direction of the light guide 110. In one example of setting the proportion of the area as such, a depth D2 of the luminous portion 114 from the interface 116 to the second light-exit surface 120 is minimum at the light-incident surface 110a, increases gradually as the distance from the light-incident surface 110a increases in the lengthwise direction of the light guide 110, and is maximum at the other end surface 110b.

In addition, the proportion of the area of the light guide portion 112 with respect to the total area of the section along a plane perpendicular to the lengthwise direction of the light guide 110 is smaller as the distance from the light-incident surface 110a increases in the lengthwise direction of the light guide 110. In one example of setting the proportion of the area as such, a depth D1 of the light guide portion 112 from the interface 116 to the first light-exit surface 118 is maximum at the light-incident surface 110a, decreases gradually as the distance from the light-incident surface 110a increases in the lengthwise direction of the light guide 110, and is minimum at the other end surface 110b.

The total area of the section of the light guide 110 along a plane perpendicular to its lengthwise direction is constant in the lengthwise direction in the present embodiment, but this is not a limiting example. The cross-sectional area of the light guide 110 may vary in the lengthwise direction.

FIG. 2 illustrates a light beam L1 incoming from the light source 108 and being emitted from the light guide 110. Light emitted from the light source 108 enters the light guide portion 112 through the light-incident surface 110a of the light guide 110. The light that has entered the light guide portion 112 is guided inside the light guide portion 112 and enters the luminous portion 114 through the interface 116. The light that has entered the luminous portion 114 is diffused by the light diffusing agent dispersed in the luminous portion 114. A portion of the diffused light is deflected toward the first light-exit surface 118 and another portion of the diffused light is deflected toward the second light-exit surface 120. The light that has been deflected toward the first light-exit surface 118 is emitted toward the front of the lamp.

As described above, according to the embodiment, the light guide 110 includes the light guide portion 112 and the luminous portion 114 each extending in the lengthwise direction, the light guide portion 112 is formed of the first material, the luminous portion 114 is formed of the second material, and the haze value of the second material is greater than the haze value of the first material. With this configuration, the vehicle lamp 100 allows the first light-exit surface 118 of the light guide 110 as a whole to emit light therethrough. The light guide 110 can allow the light to be emitted through the peripheral surface 110c even with no rugged surface shape, such as a step, provided therein.

In the light guide 110, the haze value of the first material forming the light guide portion 112 is less than 1% when the haze value is measured with the thickness of the first material set to 4 mm. Since the first material is highly transparent, the light guide portion 112 can guide the light efficiently in the lengthwise direction of the light guide 110. The dimension of the light guide 110 in the lengthwise direction can thus be further extended.

In the light guide 110, the haze value of the second material forming the luminous portion 114 is no less than 7% when the haze value is measured with the thickness of the second material set to 4 mm. The second material is not completely nontransparent and has some degree of light transmissivity. This makes it possible to provide the light guide 110 with suitable transparency. The combination of the light guide portion 112 and the luminous portion 114 allows the light guide 110 as a whole to emit faint light.

The proportion of the area of the luminous portion 114 with respect to the total area of the section of the light guide 110 along a plane perpendicular to its lengthwise direction is greater as the distance from the light-incident surface 110a increases in the lengthwise direction of the light guide 110. Typically, the amount of light traveling through the light guide portion 112 decreases as the distance from the light-incident surface 110a increases. In the present embodiment, however, the luminous portion 114 is enlarged as the distance from the light-incident surface 110a increases. The light becomes more intense where the thickness of the luminous portion 114 is greater, and the light becomes less intense where the thickness of the luminous portion 114 is smaller, which thus allows the light guide 110 to emit light uniformly throughout in its lengthwise direction.

In the vehicle lamp 100, the light guide 110 is disposed such that the first light-exit surface 118 is oriented toward the front of the lamp. In this manner, the vehicle lamp 100 including a rod-shaped light guide having no reflective step can be provided.

Figure 4:
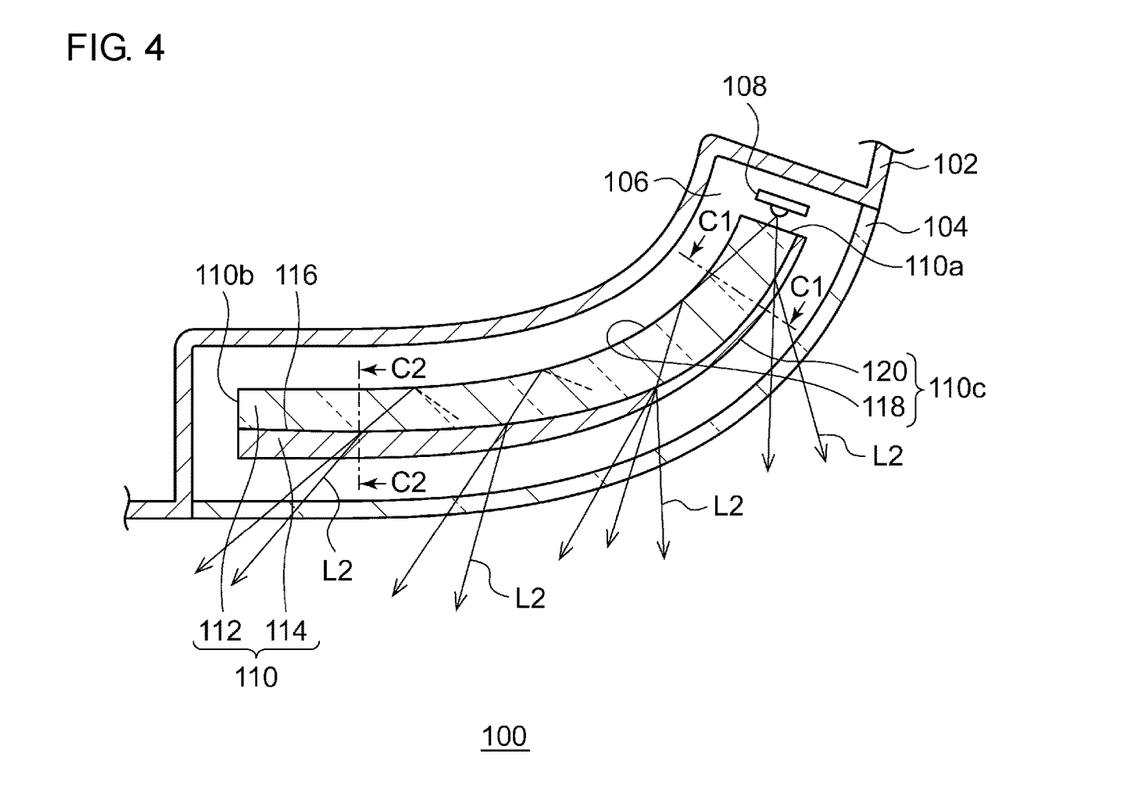
FIG. 4 is a schematic sectional view for describing a vehicle lamp according to another embodiment.
Figure 5A:
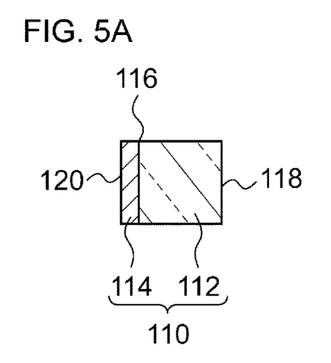
FIG. 5A is a sectional view of a rod-shaped light guide in the vehicle lamp illustrated in FIG. 4, taken along the C1-C1 line.
Figure 5B:
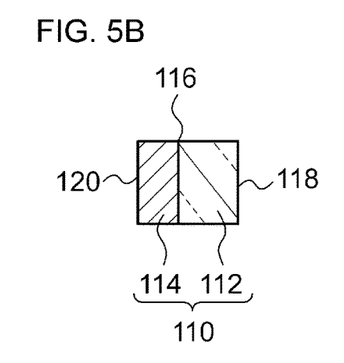
FIG. 5B is a sectional view of the rod-shaped light guide in the vehicle lamp illustrated in FIG. 4, taken along the C2-C2 line.

FIG. 4 is a schematic sectional view for describing a vehicle lamp according to another embodiment. FIG. 5A is a sectional view of a rod-shaped light guide in the vehicle lamp illustrated in FIG. 4, taken along the C1-C1 line. FIG. 5B is a sectional view of the rod-shaped light guide in the vehicle lamp illustrated in FIG. 4, taken along the C2-C2 line.

As illustrated in FIG. 4, the light guide 110 is disposed such that the second light-exit surface 120 is oriented toward the front of the lamp. FIG. 4 illustrates a light beam L2 incoming from the light source 108 and emitted from the light guide 110. Light emitted from the light source 108 enters the light guide portion 112 through the light-incident surface 110a. The light that has entered the light guide portion 112 is guided inside the light guide portion 112 and enters the luminous portion 114 through the interface 116. The light that has entered the luminous portion 114 is diffused by the light diffusing agent dispersed in the luminous portion 114. A portion of the diffused light is deflected toward the first light-exit surface 118 and another portion of the diffused light is deflected toward the second light-exit surface 120. The light that has been deflected toward the second light-exit surface 120 is emitted toward the front of the lamp.

With this configuration as well, the light guide 110 allows the light to be emitted through the peripheral surface 110c even with no rugged surface shape, such as a step, provided therein. The vehicle lamp 100 including a rod-shaped light guide having no reflective step can be provided.

As can be seen from FIGS. 4, 5A, and 5B, the proportion of the area of the luminous portion 114 with respect to the total area of the section of the light guide 110 along a plane perpendicular to its lengthwise direction is greater as the distance from the light-incident surface 110a increases in the lengthwise direction of the light guide 110. This allows the light guide 110 to emit light uniformly throughout in its lengthwise direction.

Figure 6:
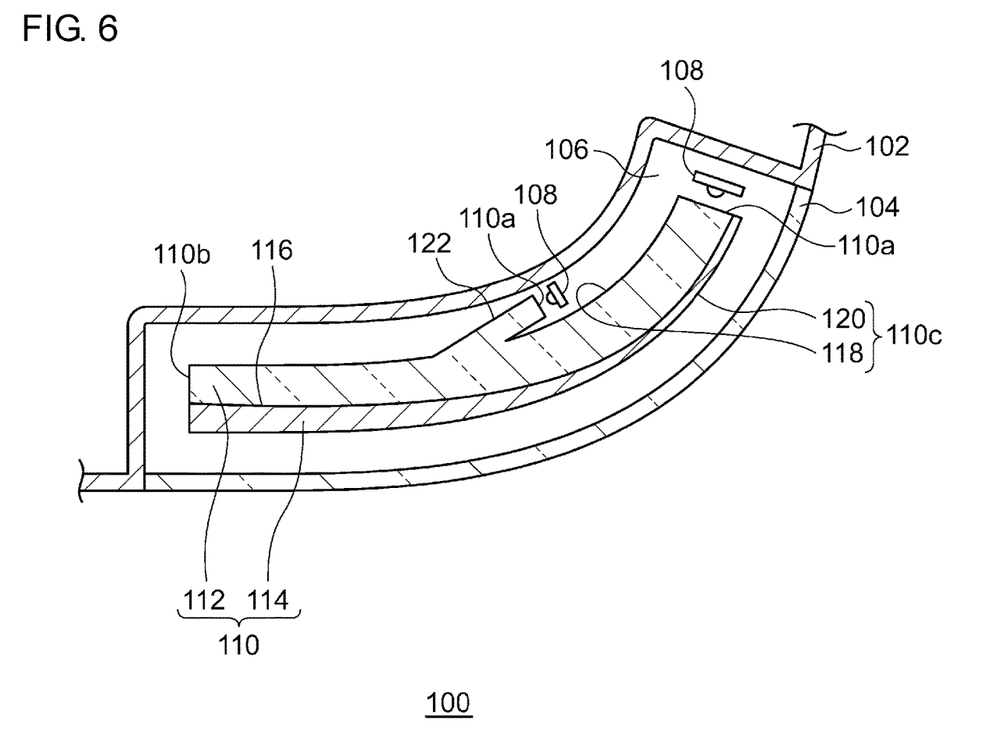
FIG. 6 is a schematic sectional view for describing a vehicle lamp according to another embodiment.

FIG. 6 is a schematic sectional view for describing a vehicle lamp according to another embodiment. As illustrated in FIG. 6, a light guide 110 may include a side branch portion 122 having a light-incident surface 110a. The side branch portion 122 is connected to the light guide portion 112 or the luminous portion 114 at an intermediate portion in the lengthwise direction of the light guide 110 or at a desired position. A light source 108 for causing light to be incident on the light-incident surface 110a is disposed to oppose the light-incident surface 110a of the side branch portion 122. A plurality of combinations of side branch portions 122 and light sources 108 may be provided. In this manner as well, the vehicle lamp including a rod-shaped light guide having no reflective step can be provided.

FIGS. 7A to 7D illustrate other examples of the light guide 110 according to an embodiment, and variations in the thickness of the light guide portion 112 and the luminous portion 114 in the lengthwise direction of the light guide 110 are illustrated. In FIGS. 7A to 7D, the lengthwise direction of the light guide 110 corresponds to the right-left direction. In addition, in FIGS. 7A to 7D, the light guide 110 is depicted to have a linear shape for the convenience of descriptions, but this is not a limiting example, and the light guide 110 may extend in a curve, as in the foregoing embodiments.

The proportion of the area of the luminous portion 114 with respect to the total area of the section of the light guide 110 along a plane perpendicular to its lengthwise direction may differ at different positions in the light guide 110 in its lengthwise direction. The depth D2 of the luminous portion 114 from the interface 116 may differ at different positions in the light guide 110 in its lengthwise direction. The light becomes more intense where the thickness of the luminous portion 114 is greater, and the light becomes less intense where the thickness of the luminous portion 114 is smaller. Thus, the amount of light can be adjusted in accordance with the position in the light guide 110 in its lengthwise direction.

The proportion of the area of the light guide portion 112 with respect to the total area of the section of the light guide 110 along a plane perpendicular to its lengthwise direction may differ at different positions in the light guide 110 in its lengthwise direction. The depth D1 of the light guide portion 112 from the interface 116 may differ at different positions in the light guide 110 in its lengthwise direction. With this configuration, the amount of light may be adjusted in accordance with the position in the light guide 110 in its lengthwise direction.

Figure 7A:
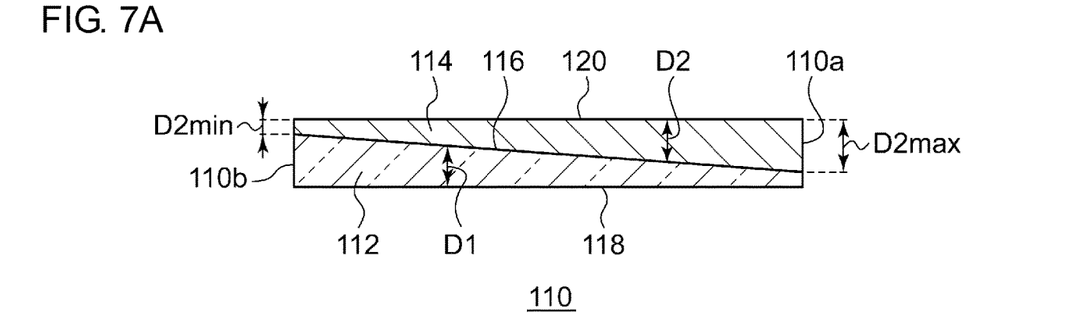
FIGS. 7A to 7D illustrate other examples of the light guide according to an embodiment.

As illustrated in FIG. 7A, the proportion of the area of the luminous portion 114 with respect to the total area of the section of the light guide 110 along a plane perpendicular to its lengthwise direction may be smaller as the distance from the light-incident surface 110a increases in the lengthwise direction of the light guide 110. The depth D2 of the luminous portion 114 from the interface 116 to the second light-exit surface 120 may take a maximum value D2max at the light-incident surface 110a, decrease gradually as the distance from the light-incident surface 110a increases in the lengthwise direction of the light guide 110, and take a minimum value D2min at the other end surface 110b. In this example, the total area of the section of the light guide 110 along a plane perpendicular to its lengthwise direction is constant regardless of the position in the light guide 110 in its lengthwise direction. Therefore, the depth D1 of the light guide portion 112 from the interface 116 to the first light-exit surface 118 is minimum at the light-incident surface 110a, increases gradually as the distance from the light-incident surface 110a increases in the lengthwise direction of the light guide 110, and is maximum at the other end surface 110b.

Figure 7B:
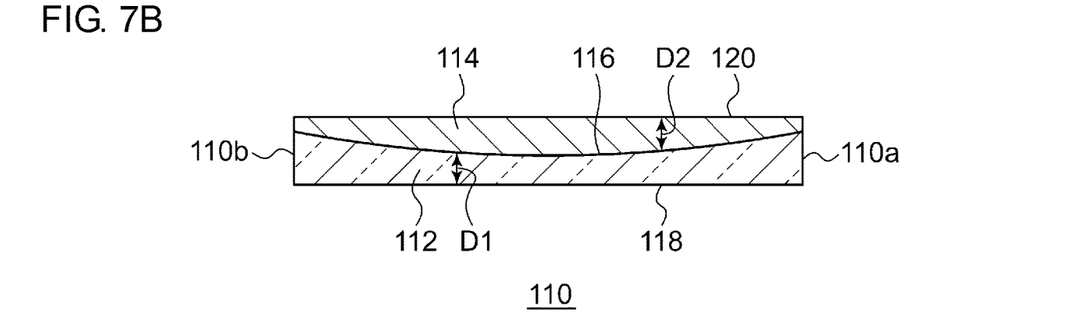
Figure 7C:
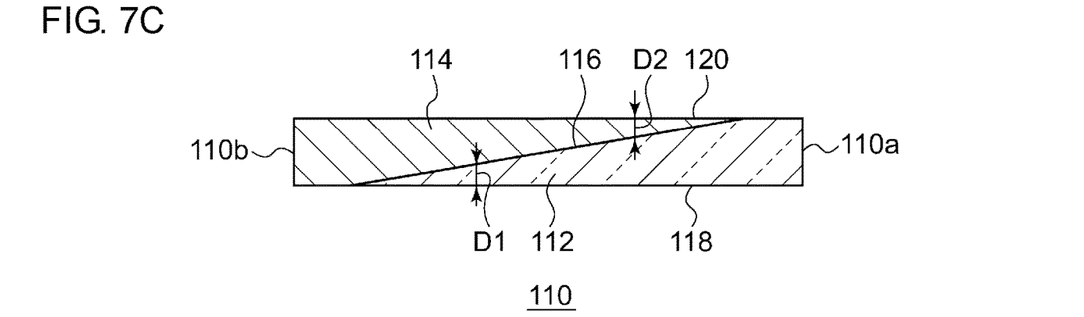

The position in the lengthwise direction at which the proportion of the area of the luminous portion 114 is maximum (or minimum) is not limited to an end of the light guide 110. As illustrated in FIG. 7B, the proportion of the area of the luminous portion 114 with respect to the total area of the section of the light guide 110 along a plane perpendicular to its lengthwise direction may be maximum at a given position in the light guide 110 in its lengthwise direction. The depth D2 of the luminous portion 114 from the interface 116 to the second light-exit surface 120 may be maximum at an intermediate position in the lengthwise direction between the light-incident surface 110a and the other end surface 110b. Alternatively, the proportion of the area of the luminous portion 114 with respect to the total area of the section of the light guide 110 along a plane perpendicular to its lengthwise direction may be minimum at a given position in the light guide 110 in its lengthwise direction. In addition, the position in the lengthwise direction at which the proportion of the area of the light guide portion 112 (e.g., the depth D1 of the light guide portion 112 from the interface 116 to the first light-exit surface 118) is maximum (or minimum) is not limited to an end of the light guide 110, either.

The light guide portion 112 does not need to extend the entire length of the light guide 110 in the lengthwise direction, and there may be a region in which the light guide portion 112 is not present. The luminous portion 114 does not need to extend the entire length of the light guide 110 in the lengthwise direction, and there may be a region in which the luminous portion 114 is not present. For example, as illustrated FIG. 7C, the light guide 110 may include only the light guide portion 112 and may not include the luminous portion 114 at the light-incident surface 110a and in the vicinity thereof. The light guide 110 may include only the luminous portion 114 and may not include the light guide portion 112 at the other end surface 110b and in the vicinity thereof.

Figure 7D:
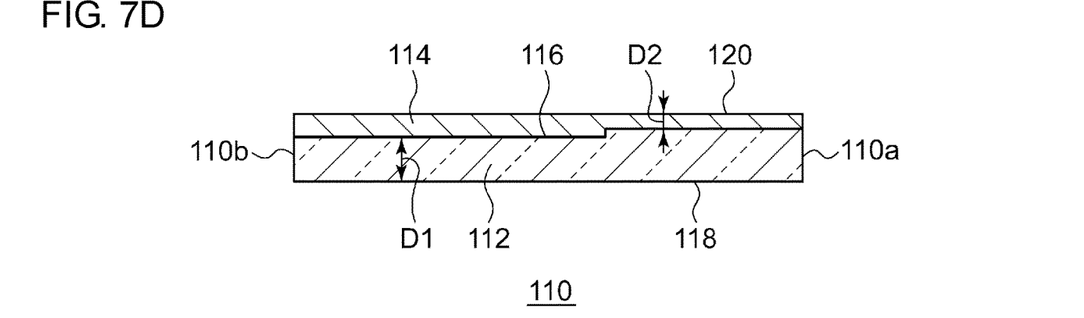

It is not essential that the proportion of the area of the luminous portion 114 vary gradually (i.e., continuously) in the lengthwise direction of the light guide 110. As illustrated in FIG. 7D, the proportion of the area of the luminous portion 114 with respect to the total area of the section of the light guide 110 along a plane perpendicular to its lengthwise direction may vary discontinuously in the lengthwise direction of the light guide 110 and may, for example, increase stepwise as the distance from the light-incident surface 110a increases in the lengthwise direction of the light guide 110. The depth D2 of the luminous portion 114 from the interface 116 to the second light-exit surface 120 may vary stepwise. The proportion of the area of the light guide portion 112 (e.g., the depth D1 of the light guide portion 112 from the interface 116 to the first light-exit surface 118) may also vary discontinuously (e.g., stepwise) in the lengthwise direction of the light guide 110. FIG. 7D illustrates a case of a variation in two steps, but the stated proportion may also vary in three or more steps.

The proportion of the area of the luminous portion 114 with respect to the total area of the section of the light guide 110 along a plane perpendicular to its lengthwise direction may be constant regardless of the position in the light guide 110 in its lengthwise direction. The thickness of the luminous portion 114 from the interface 116 may be constant in the lengthwise direction of the light guide 110. In addition, the proportion of the area of the light guide portion 112 with respect to the total area of the section of the light guide 110 along a plane perpendicular to its lengthwise direction may be constant regardless of the position in the light guide 110 in its lengthwise direction. The thickness of the light guide portion 112 from the interface 116 may be constant in the lengthwise direction of the light guide 110.

In the foregoing examples, the depth D2 of the luminous portion 114 from the interface 116 is varied to vary the proportion of the area of the luminous portion 114, but this is not a limiting example. The stated depth D2 can be regarded as a dimension of the luminous portion 114 in a first direction in the section along a plane perpendicular to the lengthwise direction of the light guide 110. In one embodiment, in place of the dimension of the luminous portion 114 in the first direction or in addition to the dimension of the luminous portion 114 in the first direction, a dimension of the luminous portion 114 in a second direction orthogonal to the first direction may vary in the lengthwise direction of the light guide 110. The dimension of the luminous portion 114 in the second direction can also be referred to as a thickness of the luminous portion 114. As such, in one embodiment, the thickness of the luminous portion 114 may be varied in the lengthwise direction of the light guide 110 to make the proportion of the area of the luminous portion 114 with respect to the total area of the section of the light guide 110 along a plane perpendicular to its lengthwise direction differ at different positions in the light guide 110 in its lengthwise direction.

Figure 8A:
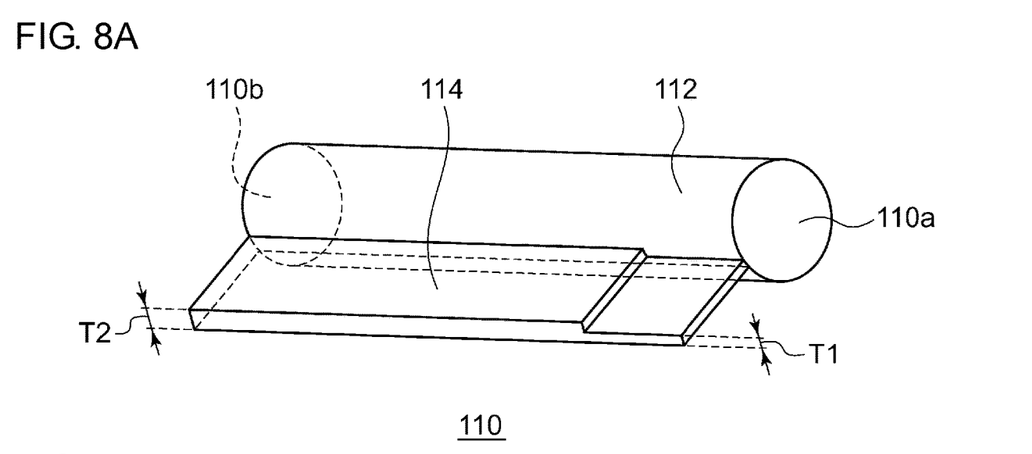
FIGS. 8A and 8B illustrate other examples of the light guide according to an embodiment.

As illustrated in FIG. 8A, the thickness of the luminous portion 114 may increase stepwise as the distance from the light-incident surface 110a increases in the lengthwise direction of the light guide 110. In one example, the luminous portion 114 may have a first thickness T1 at a side toward the light-incident surface 110a and a second thickness T2 at a side toward the other end surface 110b. The second thickness T2 is greater than the first thickness T1. In this manner, the proportion of the area of the luminous portion 114 with respect to the total area of the section of the light guide 110 along a plane perpendicular to its lengthwise direction may increase stepwise as the distance from the light-incident surface 110a increases in the lengthwise direction of the light guide 110.

Figure 8B:
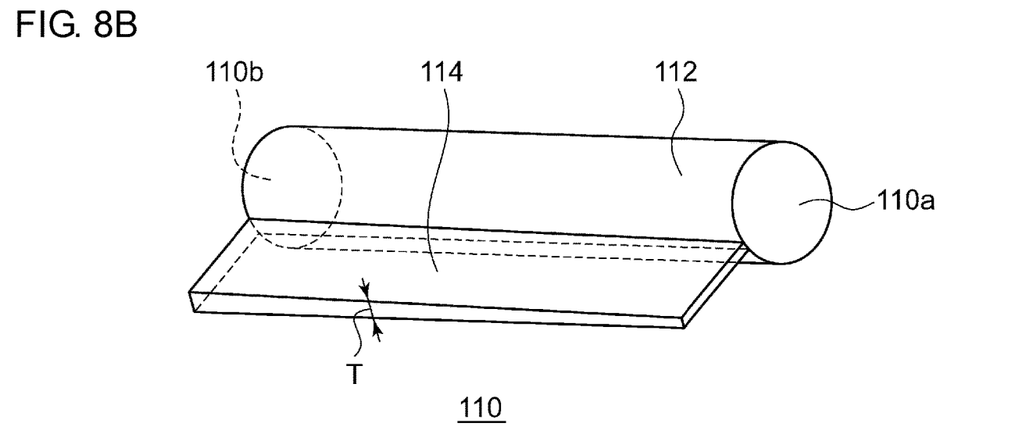

Alternatively, as illustrated FIG. 8B, a thickness T of the luminous portion 114 may increase gradually as the distance from the light-incident surface 110a increases in the lengthwise direction of the light guide 110. In one example, the thickness T of the luminous portion 114 may be minimum at the light-incident surface 110a, increase gradually as the distance from the light-incident surface 110a increases in the lengthwise direction of the light guide 110, and be maximum at the other end surface 110b.

The section of the light guide 110 along a plane perpendicular to its lengthwise direction can take various other shapes. Some examples will be described hereinafter.

Figure 9A:
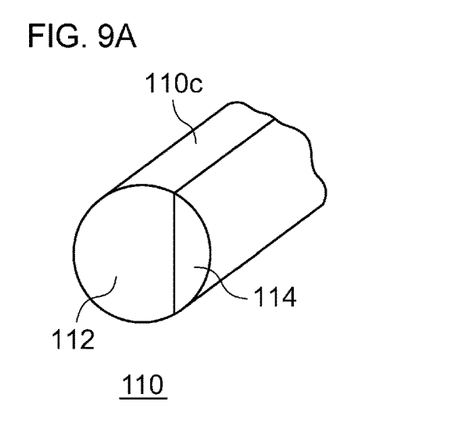
FIGS. 9A to 9D illustrate other examples of the light guide according to an embodiment.
Figure 9B:
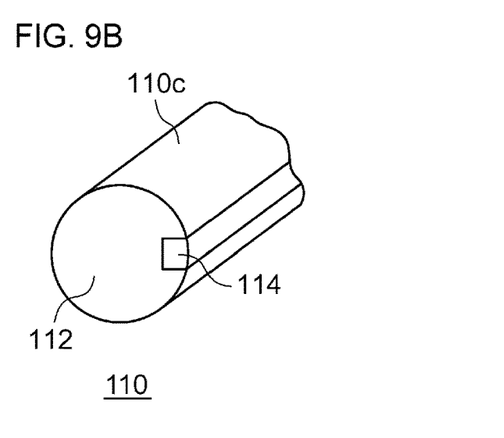

As illustrated in FIGS. 9A and 9B, the cross-sectional shape of the light guide 110 may be circular. As illustrated in FIG. 9A, the luminous portion 114 may have an arch-shaped region in the section of the light guide 110 along a plane perpendicular to its lengthwise direction. As illustrated in FIG. 9B, the luminous portion 114 may be contained in a linear recess portion provided in the peripheral surface 110c of the light guide portion 112 along the lengthwise direction of the light guide 110.

Figure 9C:
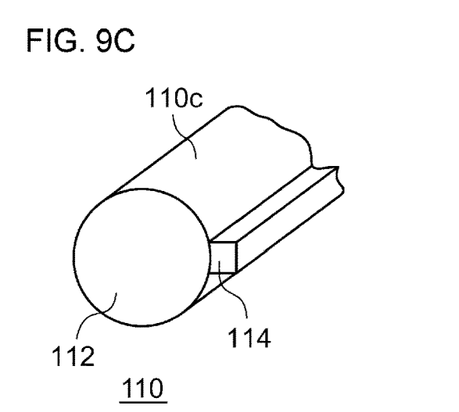
Figure 9D:
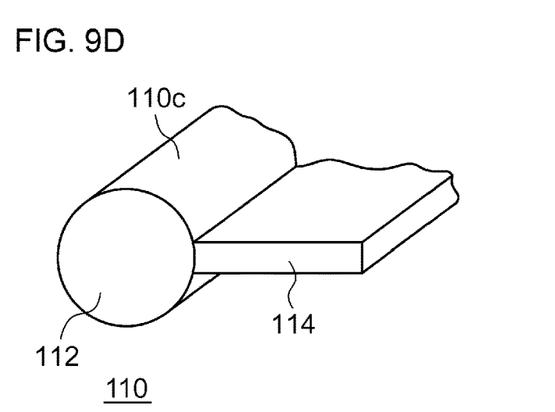

In addition, as illustrated in FIG. 9C, the luminous portion 114 may be formed into a linear projection portion provided on the peripheral surface 110c of the light guide portion 112 along the lengthwise direction of the light guide 110. As illustrated in FIG. 9D, the luminous portion 114 may be a plate-shaped portion connected to the peripheral surface 110c of the light guide portion 112 along the lengthwise direction of the light guide 110. In the examples illustrated in FIGS. 9C and 9D, the cross-sectional shape of the light guide portion 112 is circular.

Figure 10A:
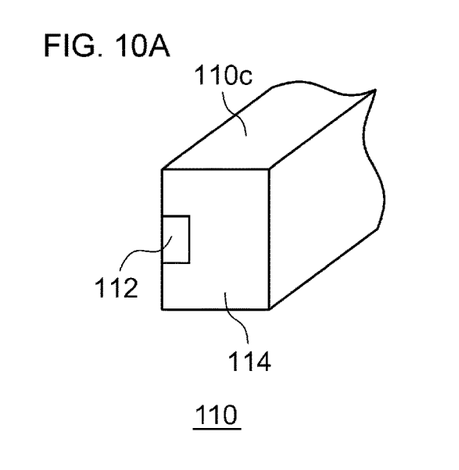
FIGS. 10A and 10B illustrate other examples of the light guide according to an embodiment.
Figure 10B:
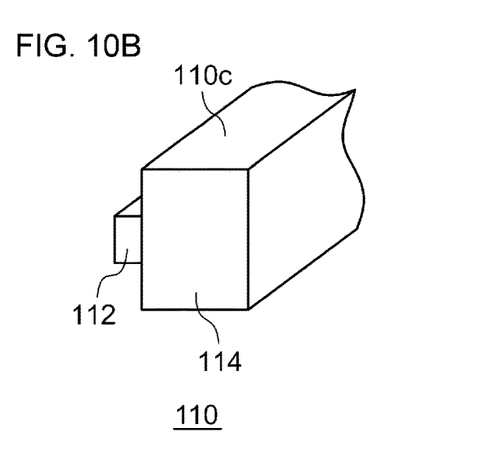

In the foregoing examples, the area of the luminous portion 114 is smaller than the area of the light guide portion 112 in the section of the light guide 110 along a plane perpendicular to its lengthwise direction, but this is not a limiting example. The area of the luminous portion 114 may be equal to or greater than the area of the light guide portion 112. As illustrated in FIG. 10A, the light guide portion 112 may be contained in a linear recess portion provided in the peripheral surface 110c of the luminous portion 114 along the lengthwise direction of the light guide 110. As illustrated in FIG. 10B, the light guide portion 112 may be formed into a linear projection portion provided on the peripheral surface 110c of the luminous portion 114 along the lengthwise direction of the light guide 110.

Figure 11A:
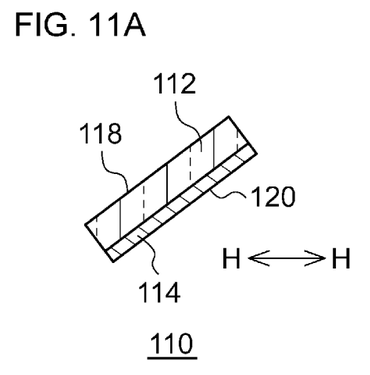
FIGS. 11A and 11B illustrate other examples of the light guide according to an embodiment.
Figure 11B:
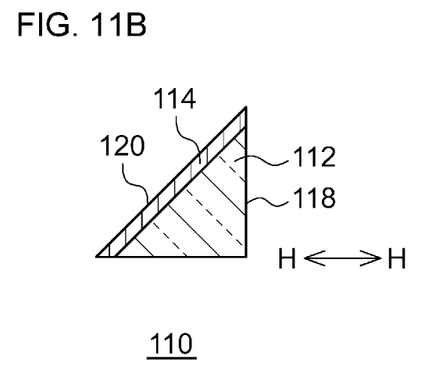

In the foregoing examples, the light guide 110 is disposed such that the first light-exit surface 118 and the second light-exit surface 120 of the light guide 110 are substantially perpendicular to a horizontal plane, but this is not a limiting example. The light guide 110 may be disposed such that at least one of the first light-exit surface 118 and the second light-exit surface 120 of the light guide 110 is inclined relative to the horizontal plane. For example, as illustrated in FIG. 11A, the cross-sectional shape of the light guide 110 may be rectangular, and the light guide 110 may be disposed such that both the first light-exit surface 118 and the second light-exit surface 120 are inclined relative to the horizontal plane. As illustrated in FIG. 11B, the cross-sectional shape of the light guide 110 may be triangular, and the light guide 110 may be disposed such that the second light-exit surface 120 is inclined relative to the horizontal plane. In FIGS. 11A and 11B, the horizontal plane is schematically indicated by the H-H line.

Figure 12A:
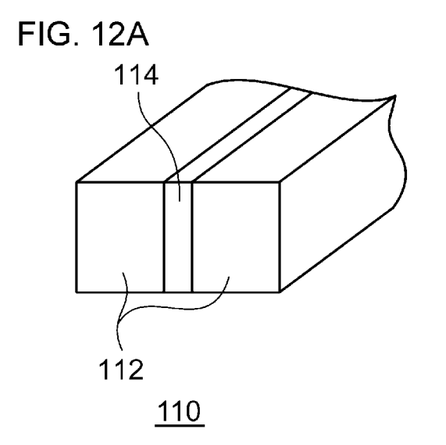
FIGS. 12A and 12B illustrate other examples of the light guide according to an embodiment.
Figure 12B:
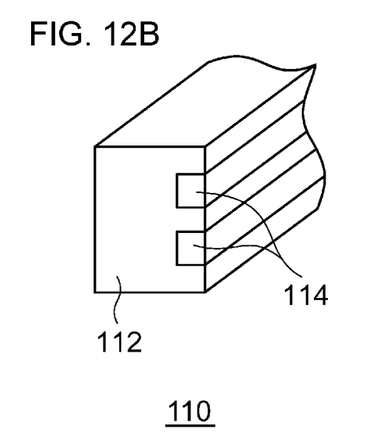

It is not necessarily the case that one light guide 110 includes one light guide portion 112. A plurality of light guide portions 112 may be provided in one light guide 110. As illustrated in FIG. 12A, the light guide 110 may include two light guide portions 112, and the luminous portion 114 may be interposed between these light guide portions 112. In addition, it is not necessarily the case that one light guide 110 includes one luminous portion 114. A plurality of luminous portions 114 may be provided in one light guide 110. As illustrated in FIG. 12B, the light guide 110 may include two luminous portions 114 formed in one side of the light guide portion 112 and extending parallel to each other along the lengthwise direction of the light guide 110.

Figure 13:
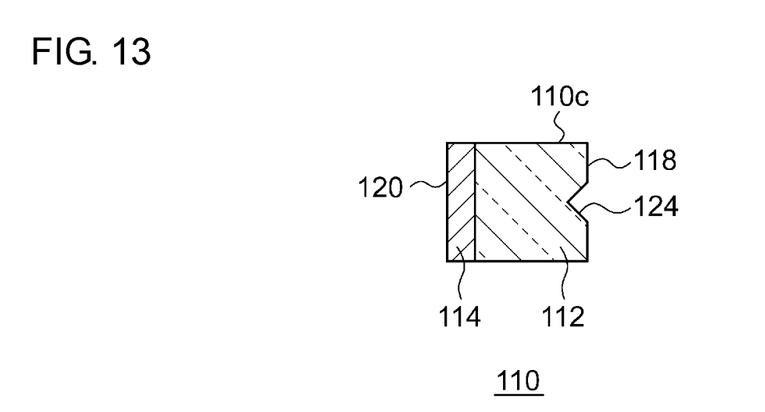
FIG. 13 illustrates another example of the light guide according to an embodiment.

As illustrated in FIG. 13, the light guide 110 may include a peripheral surface 110c having a step 124 serving as a reflective element. A plurality of steps 124 may be formed in the first light-exit surface 118 along the lengthwise direction of the light guide portion 112. The light guide 110 may include a combination of the luminous portion 114 and the step 124. The light guide 110 can thus provide a unique appearance in which generally faint light emitted from the luminous portion 114 and local spot lighting produced by the step 124 are superimposed on each other.

As described above, in some embodiments, the proportion of the area of the luminous portion 114 with respect to the total area of the section of the light guide 110 along a plane perpendicular to its lengthwise direction is greater as the distance from the light-incident surface 110a increases in the lengthwise direction of the light guide 110. Some additional examples on such embodiments will now be described.

FIGS. 14A to 14D illustrate other examples of the light guide according to an embodiment. As illustrated in FIGS. 14A to 14D, the area of the section of the light guide 110 along a plane perpendicular to its lengthwise direction (the right-left direction in the drawings) may be constant regardless of the position in the light guide 110 in its lengthwise direction. Thus, the area of the luminous portion 114 along the stated section increases as the distance from the light-incident surface 110a increases in the lengthwise direction of the light guide 110. Meanwhile, the area of the light guide portion 112 along the stated section decreases as the distance from the light-incident surface 110a increases in the lengthwise direction of the light guide 110.

Similarly to the embodiments described above, incoming light Li from the light source 108 enters the light guide portion 112 through the light-incident surface 110a of the light guide 110. The light that has entered the light guide portion 112 is guided inside the light guide portion 112 and enters the luminous portion 114 through the interface 116 between the light guide portion 112 and the luminous portion 114. The light that has entered the luminous portion 114 is diffused by the light diffusing agent dispersed in the luminous portion 114, and output light Lo is mitted through the peripheral surface 110c of the light guide 110.

Figure 14A:
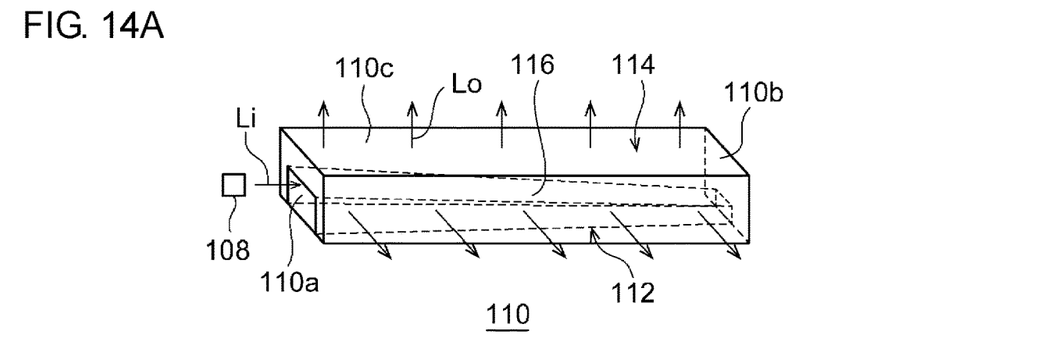
FIGS. 14A to 14D illustrate other examples of the light guide according to an embodiment.
Figure 14B:
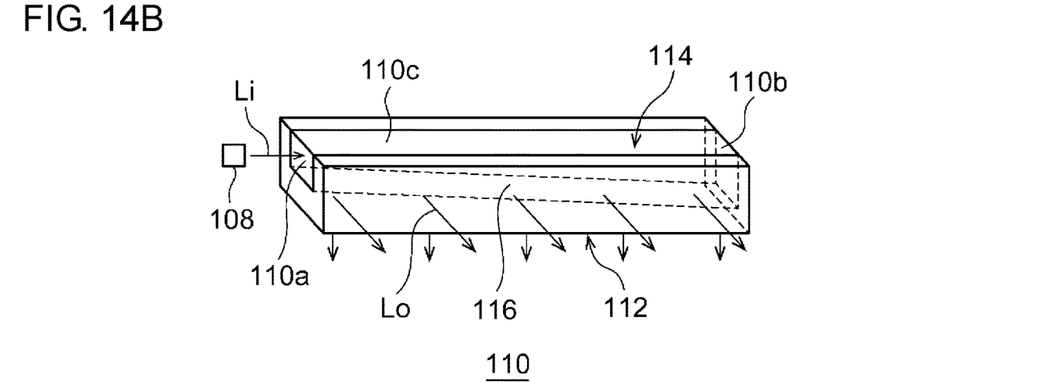
Figure 14C:
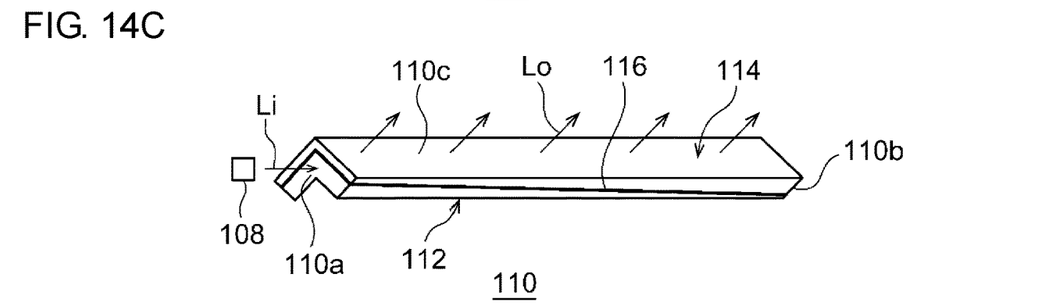

With regard to examples of the shape, as illustrated in FIGS. 14A to 14C, the interface 116 may have a plurality of faces that form an angle, and each of the faces may extend in the lengthwise direction of the light guide 110. A portion of the peripheral surface 110c of the light guide 110 is constituted by the light guide portion 112, and another portion of the peripheral surface 110c of the light guide 110 is constituted by the luminous portion 114.

In the example illustrated in FIG. 14A, similarly to the example described with reference to FIG. 10A, the light guide portion 112 is contained in a linear recess portion provided in the luminous portion 114 along the lengthwise direction of the light guide 110. As the light guide portion 112 and the luminous portion 114 are combined, the light guide 110 as a whole has an elongated rectangular parallelepiped shape that extends in the lengthwise direction. The light guide portion 112 has a quadrangular prismoidal shape that extends in the lengthwise direction, and three of its side surfaces, serving as the interface 116, are bonded to the luminous portion 114. The remaining one side surface of the light guide portion 112, along with the luminous portion 114, constitutes the peripheral surface 110c of the light guide 110. The light guide portion 112 becomes thinner as the distance from the light-incident surface 110a increases. Therefore, a first end surface of the light guide portion 112 that partially constitutes the light-incident surface 110a is broader than a second end surface of the light guide portion 112 that partially constitutes the end surface 110b on the opposite side.

In the example illustrated in FIG. 14B, as compared to the example illustrated in FIG. 14A, the arrangement of the light guide portion 112 and the luminous portion 114 is reversed, and the luminous portion 114 is contained in linear recess portion provided in the light guide portion 112 along the lengthwise direction of the light guide 110. The luminous portion 114 has a quadrangular prismoidal shape that extends in the lengthwise direction, three of its side surfaces serve as the interface 116 between the luminous portion 114 and the light guide portion 112, and the remaining side surface, along with the light guide portion 112, constitutes the peripheral surface 110c of the light guide 110. The luminous portion 114 becomes thicker as the distance from the light-incident surface 110a increases (i.e., as the distance to the end surface 110b decreases).

In the example illustrated in FIG. 14C, the light guide 110 has an L-shaped section along a plane perpendicular to its lengthwise direction. The light guide portion 112 and the luminous portion 114 each have an L-shaped cross-section, and the interface 116 is composed of two faces that form an angle. The thickness of the luminous portion 114 along a section perpendicular to the lengthwise direction of the light guide 110 increases as the distance from the light-incident surface 110a increases in the lengthwise direction, and the thickness of the light guide portion 112 decreases as the distance from the light-incident surface 110a increases in the lengthwise direction.

Figure 14D:
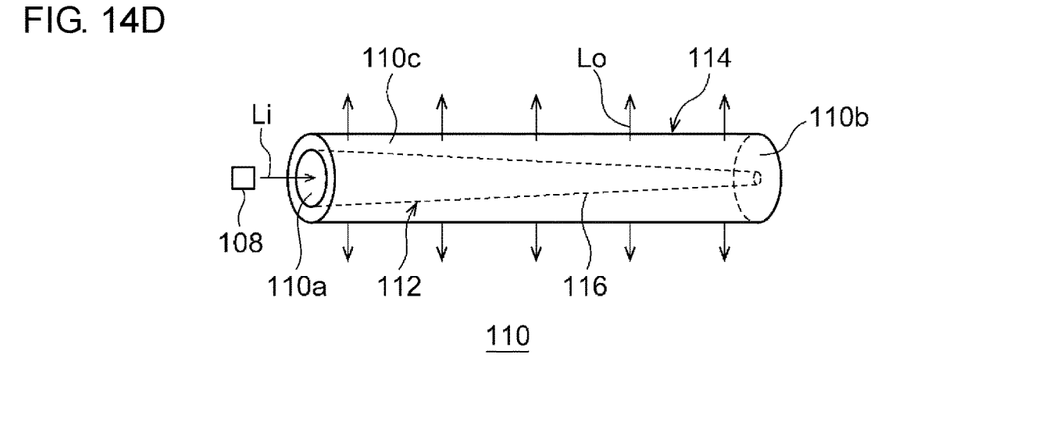

As illustrated in FIG. 14D, the light guide 110 may have an elongated round columnar shape that extends in the lengthwise direction. The light guide portion 112 is disposed in a center portion of the light guide 110, and the luminous portion 114 is disposed in an outer peripheral portion of the light guide 110. The light guide portion 112 has a frustoconical shape that extends in the lengthwise direction, and its entire side surface, serving as the interface 116, is bonded to the luminous portion 114. The side surface of the luminous portion 114 serves as the peripheral surface 110c of the light guide 110. The light guide portion 112 becomes thinner as the distance from the light-incident surface 110a increases. Therefore, the first end surface of the light guide portion 112 that partially constitutes the light-incident surface 110a is broader than the second end surface of the light guide portion 112 that partially constitutes the end surface 110b on the opposite side.

The light that has once entered the luminous portion 114 from the light guide portion 112 is diffused by the light diffusing agent in the luminous portion 114 and emitted outside. Thus, the light is less likely to propagate in the lengthwise direction of the light guide 110. Therefore, the light guide 110 can be considered to have a tendency of emitting more light from the luminous portion 114 at a position closer to the light-incident surface 110a. Such a tendency is mitigated as the light guide 110 includes the light guide portion 112 that extends in the lengthwise direction (i.e., the light guide 110 can guide the light in its lengthwise direction through the light guide portion 112). However, if the stated tendency becomes prominent, the light guide 110 may be relatively brighter in the vicinity of the light-incident surface 110a and relatively dimmer in the vicinity of the end surface 110b on the opposite side. This is not preferable when it is desired that the light be emitted uniformly in the lengthwise direction of the light guide 110.

According to the embodiments illustrated in FIGS. 14A to 14D, the proportion of the area of the luminous portion 114 with respect to the total area of the section of the light guide 110 along a plane perpendicular to its lengthwise direction is greater as the distance from the light-incident surface 110a increases in the lengthwise direction of the light guide 110. In other words, the proportion of the area of the luminous portion 114 is smaller in the vicinity of the light-incident surface 110a. The light becomes more intense where the proportion of the area of the luminous portion 114 is greater, and the light becomes less intense where the proportion of the area of the luminous portion 114 is smaller. Thus, the amount of light emitted from the luminous portion 114 in the vicinity of the light-incident surface 110a is reduced. Therefore, a greater amount of light can be guided in the lengthwise direction through the light guide portion 112 toward the end surface 110b on the opposite side, and this allows the light guide 110 to emit light more uniformly throughout in its lengthwise direction. Consequently, when the light guide 110 is employed, for example, in a vehicle lamp such as a beacon light for an automobile, the visibility from the surroundings such as pedestrians and other vehicles improves. This also help improve the safety.

In addition, if desired, appropriately adjusting the proportion of the area of the luminous portion 114 in the lengthwise direction or any other direction allows the light guide 110 to emit light with gradation or emit light in any other desired emission distribution.

In the examples illustrated in FIGS. 14A to 14D, the area of the light guide portion 112 (and the luminous portion 114) varies gradually in the lengthwise direction of the light guide 110, but this is not a limiting example. Similarly to the examples described with reference to FIG. 7D and FIG. 8A, the area of the light guide portion 112 (and the luminous portion 114) may vary stepwise in the lengthwise direction of the light guide 110. In addition, as described with reference to FIG. 7C, it is not essential that the light guide portion 112 be present throughout the lengthwise direction of the light guide 110. For example, no light guide portion 112 may be present in the end surface 110b opposite to the light-incident surface 110a and in the vicinity of the end surface 110b, and the end surface 110b and the vicinity thereof may be constituted by the luminous portion 114 alone.

Although this has already been stated above, typically, a light guide at least partially having a region that includes a diffuser tends to emit brighter light at a position closer to a light-entering portion. Therefore, it is easy to design a light guide that can emit light with such gradation that becomes dimmer as the distance from the light-entering portion increases. However, it is difficult to achieve light emission with gradation in the reverse direction. Specifically, it is difficult to achieve light emission with such gradation that is dimmer at a portion closer to the light-entering portion and brighter at a portion farther from the light-entering portion.

Figure 15A:
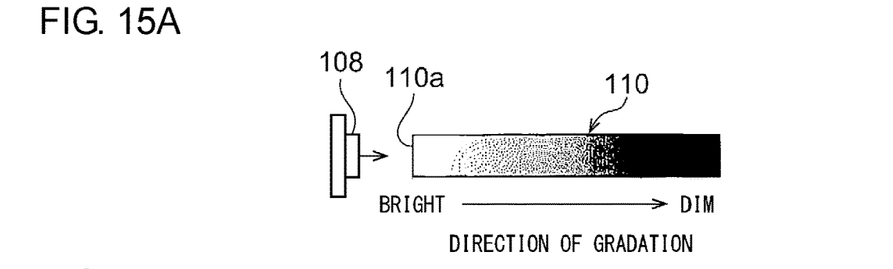
FIGS. 15A to 15D illustrate other examples of the light guide according to an embodiment.

FIGS. 15A to 15D illustrate other examples of the light guide 110 according to an embodiment. As stated above, the use of the light guide 110 according to the embodiment allows, with relative ease, for achieving light emission with such gradation that is brighter at a portion closer to the light source 108 and the light-incident surface 110a along the lengthwise direction of the light guide 110 and that is dimmer at a portion farther therefrom, as illustrated in FIG. 15A.

Figure 15B:
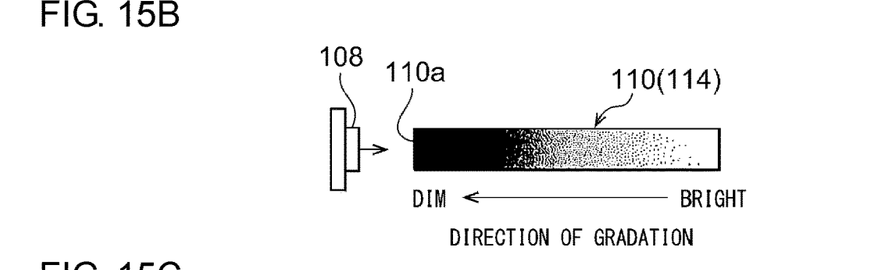

In addition, the light guide 110 according to the embodiment makes it possible to achieve light emission with such gradation that is dimmer at a position closer to the light source 108 and the light-incident surface 110a and that is brighter at a position farther from the light source 108 and the light-incident surface 110a, as illustrated in FIG. 15B, by designing the luminous portion 114 in accordance with the distance from the light-incident surface 110a. Such application examples will now be described.

Figure 15C:
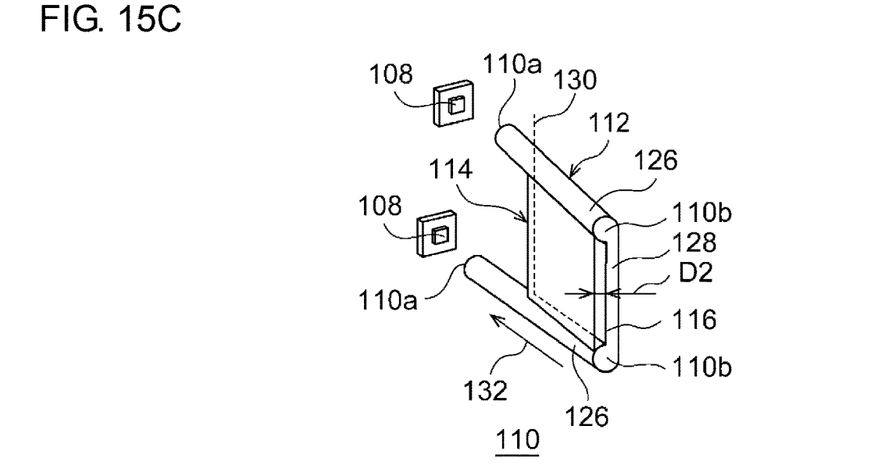

In the example illustrated in FIG. 15C, the proportion of the area of the luminous portion 114 with respect to the total area of the section of the light guide 110 along a plane perpendicular to its lengthwise direction is greater as the distance from the light-incident surface 110a increases in the lengthwise direction of the light guide 110. The area of the section of the light guide portion 112 along a plane perpendicular to its lengthwise direction is constant regardless of the position in the light guide 110 in its lengthwise direction, and the area of the luminous portion 114 along the stated section increases as the distance from the light-incident surface 110a increases in the lengthwise direction of the light guide 110.

In one exemplary configuration, the light guide portion 112 includes two light pipes 126 and a light guide plate 128. The two light pipes 126 are each formed into a round rod shape that extends in the lengthwise direction and are disposed parallel to each other with a gap provided therebetween. A light source 108 is disposed in the vicinity of one end of each of the light pipes 126. This one end of each of the light pipes 126 is used as the light-incident surface 110a. The light guide plate 128 is formed into a rectangular plate and disposed between the two light pipes 126 to connect these light pipes 126. The light pipes 126 and the light guide plate 128 are formed integrally of the first material described above. The luminous portion 114 is bonded to one principal surface of the light guide plate 128, and the interface 116 is formed between the light guide portion 112 and the luminous portion 114. The luminous portion 114 extends between the two light pipes 126 along the light guide plate 128. The luminous portion 114 is formed of the second material described above.

The depth D2 of the luminous portion 114 from the interface 116 is minimum at a position 130 closest to the light-incident surfaces 110a, increases gradually as the distance from the light-incident surfaces 110a increases in the lengthwise direction of the light guide 110, and is maximum at the other end surfaces 110b.

The light from the light sources 108 enters the light guide portion 112 through the light-incident surfaces 110a of the light guide 110, is guided inside the light guide portion 112, and enters the luminous portion 114 through the interface 116 between the light guide portion 112 and the luminous portion 114. The light that has entered the luminous portion 114 is diffused by the light diffusing agent dispersed in the luminous portion 114 and emitted from the luminous portion 114.

The light becomes less intense where the thickness D2 of the luminous portion 114 is smaller, and the light becomes more intense where the thickness D2 of the luminous portion 114 is greater. Thus, as indicated by an arrow 132 in FIG. 15C, the light guide 110 allows for light emission with such gradation that is dimmer at a position closer to the light-incident surfaces 110a in the lengthwise direction and that is brighter at a position farther from the light-incident surfaces 110a. The arrow 132 indicates that the brightness decreases gradually toward the head of the arrow, as in FIG. 15A and FIG. 15B.

Figure 15D:
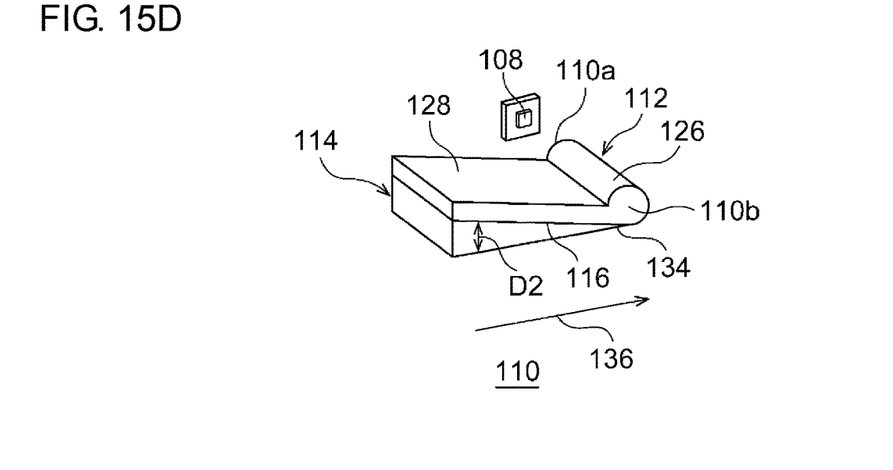

In another exemplary configuration, as illustrated in FIG. 15D, the light guide portion 112 may include a single light pipe 126 and a light guide plate 128. A light source 108 is disposed in the vicinity of one end of the light pipe 126, and this one end of the light pipe 126 serves as the light-incident surface 110a. The light guide plate 128 is formed into a rectangular plate and is bonded at one side thereof to a side surface of the light pipe 126. Thus, the light guide plate 128 is disposed along a plane parallel to two directions including the lengthwise direction of the light guide 110 (i.e., the center axis direction of the light pipe 126) and a direction perpendicular thereto. The area of the section of the light guide 110 along a plane perpendicular to its lengthwise direction is constant regardless of the position in the light guide 110 in its lengthwise direction. In addition, the proportion of the area of the luminous portion 114 with respect to the total area of the section of the light guide 110 along a plane perpendicular to its lengthwise direction is also constant.

The thickness D2 of the luminous portion 114 from the interface 116 is minimum at a position 134 closest to the light pipe 126 and increases gradually as the distance from the light pipe 126 increases in the direction perpendicular to the aforementioned axial direction of the light pipe 126. The light becomes more intense where the thickness D2 of the luminous portion 114 is greater, and the light becomes less intense where the thickness D2 of the luminous portion 114 is smaller. Thus, as indicated by an arrow 136 in FIG. 15D, the light guide 110 allows for achieving light emission with such gradation that is dimmer at a position closer to the light pipe 126 in the direction perpendicular to the axial direction of the light pipe 126 and that is brighter at a position farther from the light pipe 126. The arrow 136 indicates that the brightness decreases gradually toward the head of the arrow, as in FIG. 15A and FIG. 15B.

In this manner, the light guides 110 according to the embodiments illustrated in FIG. 15C and FIG. 15D are each configured such that the luminous portion 114 emits dimmer light at a position closer to the light-incident surface 110a and emits brighter light at a position farther from the light-incident surface 110a. Unlike any existing light guide, the light guide 110 allows, with ease, for achieving light emission with such gradation that is dimmer at a position closer to the light-incident surface 110a and that is brighter at a position farther from the light-incident surface 110a. In addition, regardless of which of the two end surfaces of the light guide 110 the light source 108 is disposed adjacent to in the stage of designing the light guide 110, either of the two gradation directions illustrated in FIG. 15A and FIG. 15B can be selected as desired. In this manner, the arrangement of the light source 108 is excluded from the design factors that determine the gradation direction, and the degree of freedom in the lamp design thus improves.

The present invention is not limited to the foregoing embodiments and modifications. The embodiments and the modifications can be combined, or further modifications, including various design changes, can be made to the foregoing embodiments and modifications on the basis of the knowledge of a person skilled in the art. An embodiment or a modification obtained through such combinations or by making further modifications is also encompassed by the scope of the present invention. The foregoing embodiments and modifications and a new embodiment obtained by combining the foregoing embodiments and modifications with the following modifications have advantageous effects of each of the combined embodiments, modifications, and further modifications.

In the foregoing embodiments, a clearance lamp has been illustrated as an example of the vehicle lamp. However, the vehicle lamp is not limited to a clearance lamp, and the present invention can be widely applied to various types of vehicle lamps, including a turn signal lamp, a stop lamp, a daytime running lamp, a cornering lamp, a hazard warning lamp, a position lamp, a backup lamp, a fog lamp, and a head lamp.

What is claimed is:

1. A vehicle lamp, comprising:
   a lamp body having an opening;
   a curved light-transmissive outer cover that covers the opening in the lamp body; and
   a curved rod-shaped light guide arranged in a lamp room formed between the lamp body and the curved light-transmissive outer cover, the curved rod-shaped light guide curved along a curved shape of the curved light-transmissive outer cover,
   the curved rod-shaped light guide configured to allow at least a portion of light incident on a light-incident surface to be emitted through a peripheral surface, the curved rod-shaped light guide comprising
      a light guide portion extending in a lengthwise direction of the curved rod-shaped light guide, the light guide portion being formed of a first material, and
      a luminous portion extending in the lengthwise direction of the curved rod-shaped light guide along the light guide portion, the luminous portion being formed of a second material,
      the second material having a haze value greater than a haze value of the first material,
   wherein the haze value of the first material is less than 1% when the haze value is measured with a thickness of the first material set to 4 mm,
   wherein the haze value of the second material is no less than 7% when the haze value is measured with a thickness of the second material set to 4 mm,
   wherein no step serving as a reflective element is formed in the peripheral surface of the curved rod-shaped light guide.

2. The vehicle lamp according to claim 1, wherein an interface at which the light guide portion and the luminous portion adjoin is formed between an entire side surface of the light guide portion and the luminous portion.

3. The vehicle lamp according to claim 1, wherein
   the haze value of the second material is no greater than 30% when the haze value is measured with the thickness of the second material set to 4 mm.

4. The vehicle lamp according to claim 1, wherein
a proportion of an area of the luminous portion with respect to a total area of a section of the curved rod-shaped light guide along a plane perpendicular to the lengthwise direction thereof differs at different positions in the curved rod-shaped light guide in the lengthwise direction thereof.

5. The vehicle lamp according to claim 1, wherein
a proportion of an area of the luminous portion with respect to a total area of a section of the curved rod-shaped light guide along a plane perpendicular to the lengthwise direction thereof is greater as a distance from the light-incident surface increases in the lengthwise direction of the curved rod-shaped light guide.

6. The vehicle lamp according to claim 1, wherein
a section of the curved rod-shaped light guide along a plane perpendicular to the lengthwise direction thereof has one of a polygonal shape, a circular shape, and a shape in which a polygon and a circle are combined.

7. The vehicle lamp according to claim 1, wherein
the second material contains a light diffusing agent, and the first material contains no light diffusing agent or contains the light diffusing agent at a concentration lower than that in the second material.

8. The vehicle lamp according to claim 1, wherein
the curved rod-shaped light guide is an integrally molded piece.

9. The vehicle lamp according to claim 1, wherein
the curved rod-shaped light guide is configured such that the luminous portion emits dimmer light at a position closer to the light-incident surface and emits brighter light at a position farther from the light-incident surface.

10. The vehicle lamp according to claim 1, wherein
the light guide portion having a first light-exit surface constituting a portion of the peripheral surface,
the luminous portion having a second light-exit surface constituting another portion of the peripheral surface, and
the curved rod-shaped light guide being disposed such that one of the first light-exit surface, and the second light-exit surface is oriented toward a front of the vehicle lamp.

11. The vehicle lamp according to claim 1, wherein
an interface at which the light guide portion and the luminous portion adjoin includes a plurality of faces extending from the light-incident surface in the lengthwise direction of the curved rod-shaped light guide, each face of the plurality of faces arranged to be angled in transverse cross-section relative to another face of the plurality of faces adjacent to the each face, the transverse cross-section being perpendicular to the lengthwise direction of the curved rod-shaped light guide.

* * * * *